US009940874B2

(12) United States Patent
Ma

(10) Patent No.: US 9,940,874 B2
(45) Date of Patent: Apr. 10, 2018

(54) PIXEL COMPENSATING CIRCUITS, RELATED DISPLAY APPARATUS AND METHOD FOR DRIVING THE SAME

(71) Applicant: BOE TECHNOLOGY GROUP CO., LTD, Beijing (CN)

(72) Inventor: Zhanjie Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/031,112

(22) PCT Filed: Sep. 18, 2015

(86) PCT No.: PCT/CN2015/089927
§ 371 (c)(1),
(2) Date: Apr. 21, 2016

(87) PCT Pub. No.: WO2016/127644
PCT Pub. Date: Aug. 18, 2016

(65) Prior Publication Data
US 2016/0358546 A1 Dec. 8, 2016

(30) Foreign Application Priority Data
Feb. 9, 2015 (CN) .......................... 2015 1 0066725

(51) Int. Cl.
*G09G 3/30* (2006.01)
*G06F 3/038* (2013.01)
(Continued)

(52) U.S. Cl.
CPC ............. *G09G 3/3233* (2013.01); *G09G 3/32* (2013.01); *G09G 2230/00* (2013.01);
(Continued)

(58) Field of Classification Search
CPC ..................... G09G 3/3233; G09G 2300/0819
See application file for complete search history.

(56) References Cited

U.S. PATENT DOCUMENTS

2006/0044244 A1* 3/2006 Numao ................ G09G 3/3233 345/92
2013/0088474 A1* 4/2013 Wang .................. G09G 3/3258 345/211
(Continued)

FOREIGN PATENT DOCUMENTS

CN 102629447 A 8/2012
CN 103985352 A 8/2014
(Continued)

OTHER PUBLICATIONS

The World Intellectual Property Organization (WIPO) International Search Report for PCT/CN2015/089927 dated Dec. 16, 2015 p. 1-5.
(Continued)

*Primary Examiner* — Nan-Ying Yang
(74) *Attorney, Agent, or Firm* — Anova Law Group, PLLC

(57) ABSTRACT

The present disclosure provides a pixel compensating circuit. The circuit includes a driving module and a resetting module connected to a reference voltage line for providing an initial potential and a reset-control potential, a scanning signal line, and the driving module. The circuit further includes a data-writing module connected to a data signal line, the scanning signal line, and the driving module.

19 Claims, 9 Drawing Sheets

(51) Int. Cl.
*G09G 5/00* (2006.01)
*G09G 5/10* (2006.01)
*G09G 3/3233* (2016.01)
*G09G 3/32* (2016.01)

(52) U.S. Cl.
CPC ............... *G09G 2300/0819* (2013.01); *G09G 2300/0842* (2013.01); *G09G 2300/0861* (2013.01); *G09G 2310/061* (2013.01); *G09G 2320/043* (2013.01); *G09G 2330/08* (2013.01)

(56) References Cited

U.S. PATENT DOCUMENTS

2014/0002701 A1 1/2014 Koifman
2014/0049169 A1* 2/2014 Li ...................... H05B 33/0896 315/173
2014/0225878 A1 8/2014 Shih et al.
2015/0310802 A1* 10/2015 Guo ..................... G09G 3/3233 345/212

FOREIGN PATENT DOCUMENTS

CN 104217682 A 12/2014
KR 20130128834 A 11/2013
TW 201021002 A 6/2010

OTHER PUBLICATIONS

Ching-Lin Fan et al, An AMOLED AC-Biased Pixel Design Compensating the Threshold Voltage and I-R Drop, Hindawi Publishing Corporation, International Journal of Photoenergy, vol. 2011, Article ID 543273 Sep. 1, 2011 pp. 1-7.
Young-Ju Park et al, A New Voltage Driven Pixel Circuit for Large Sized AMOLED Panel, IDW '04 Jan. 1, 2004 pp. 539-540.

* cited by examiner

PIXEL COMPENSATING CIRCUITS, RELATED DISPLAY APPARATUS AND METHOD FOR DRIVING THE SAME

CROSS-REFERENCES TO RELATED APPLICATIONS

This application is a national phase entry under 35 U.S.C. § 371 of International Application No. PCT/CN2015/089927, filed on Sep. 18, 2015, which claims priority to Chinese Patent Application No. 201510066725.5, filed on Feb. 9, 2015 the above enumerated patent applications are incorporated by reference herein in their entirety.

FIELD OF THE INVENTION

The present invention generally relates to the display technologies and, more particularly, relates to pixel compensating circuits, related display apparatus, and method for driving the same.

BACKGROUND

Organic light-emitting diodes (OLEDs) are current-driven self-luminous devices. OLEDs have short response times, high display brightness level, high display contrasts, and wide viewing angles. OLEDs can be fabricated on flexible/soft substrates. Because of the features described above, OLEDs have been widely used in display technology. Each pixel on an OLED display panel includes OLEDs. Based on the driving method, OLED display panels may be divided into active OLED display panels and passive OLED display panels. In an active OLED display panel, a thin-film transistor (TFT) circuit may be used to control the electric current flow through each OLED such that the OLED display panel has a uniform brightness level. Each TFT in the TFT circuit needs to be sufficiently stable to ensure the current flow through the OLED remains stable.

The stability of a TFT may be susceptible to the threshold voltage of the TFT. For example, the threshold voltage of a TFT may be subjected to factors such as the doping material of the drain, the thickness of the dielectric layer, gate material, excess charges in the dielectric layer, etc. Thus, under existing fabricating conditions, the threshold voltages of the TFTs in a TFT circuit are likely to be different due to the factors described above. The differences in the threshold voltages may cause the current flowing through each OLED to vary. Therefore, pixel compensating circuits have been used to reduce the differences in the threshold voltages among the TFTs.

FIG. 1 shows an existing pixel compensating circuit. The pixel compensating circuit includes an OLED D1, a driving transistor M1, a data-voltage writing module (transistor M5), a lighting-control module (transistor M3), a switching module (transistor M2), a resetting module (transistor M4, transistor M11, and capacitor C1). In the resetting module, the capacitor C1 is connected to the power supply $V_{DD}$ through one terminal and connected to the reset-control signal $V_{reset}$ and the initial voltage signal $V_{ini}$ through transistor M11. In a resetting phase, the reset-control signal $V_{reset}$ is turned on, the voltage provided by $V_{reset}$ remains unchanged, and transistor M4 remains on. Thus, by controlling the voltage provided by the initial voltage signal $V_{ini}$, the control terminal of driving transistor M1 may be reset to a low potential $V_{ini}$. As shown in this layout, the existing pixel compensating circuit requires 6 transistors, 1 capacitor, and 6 signal lines.

As described above, the structure of the existing pixel compensating circuit is undesirably complex. That is, besides the OLEDs, the existing pixel compensating circuit requires 6 transistors, 1 capacitor, and 6 signal lines. The number of transistors and the number of signal lines may both be large. The large number of transistors and signal lines may not be suitable for the layouts of display products with high resolutions, and the production cost of the display apparatus may be high.

BRIEF SUMMARY OF THE DISCLOSURE

The present disclosure provides a pixel compensating circuit and display apparatus to address one or more problems in the existing pixel compensating circuit, such as a large number of transistors and signal lines and high production yield.

An aspect of the present disclosure provides a pixel compensating circuit. The circuit includes a driving module and a resetting module connected to a reference voltage line for providing an initial potential and a reset-control potential, a scanning signal line, and the driving module. The circuit further includes a data-writing module connected to a data signal line, the scanning signal line, and the driving module.

Optionally, the circuit further includes a lighting-control module connected to a lighting-control signal line and the driving module.

Optionally, the circuit further includes a lighting module connected to the driving module.

Optionally, the resetting module is configured to receive a reference voltage signal and reset a potential of a control terminal of the driving module based on a change of the reference voltage signal such that the reference voltage signal combines functions of a reset control signal and an initial voltage signal.

Optionally, the data-writing module is configured to output a data voltage signal and write the data voltage signal into the control terminal of the driving module based on the scanning signal.

Optionally, the lighting-control module is configured to write a power supply voltage into a first terminal of the driving module based on a lighting-control signal provided by a lighting-control line.

Optionally, the circuit further includes a switching module connected to the driving module and the lighting module to control an electrical connection between the driving module and the lighting module.

Optionally, the resetting module includes a first switching device and a first capacitor; a first terminal of the first switching device is connected to a second terminal of the driving module, a second terminal of the first switching device being connected to the control terminal of the driving module and a control terminal of the first switching device being connected to the scanning signal line; and a first terminal of the first capacitor is connected to the reference voltage line, a second terminal of the first capacitor being connected to the control terminal of the driving module and the second terminal of the first switching device such that the reference voltage line is configured to generate the reset-control potential and the initial potential.

Optionally, the resetting module includes a first switching device and a first capacitor; a first terminal of the first switching device is connected to a second terminal of the driving module, a second terminal of the first switching device being connected to the control terminal of the driving module and a control terminal of the first switching device being connected to the scanning signal line; and a first terminal of the first capacitor is connected to the reference voltage line and a lighting-control module, a second terminal of the first capacitor being connected to the control terminal of the driving module and the second terminal of the first switching device such that the reference voltage line is configured to generate the reset-control potential, the initial potential, and the power supply voltage.

Optionally, the data-writing module includes a second switching device; and a first terminal of the second switching device is connected to the data signal line, a control terminal of the second switching device being connected to the scanning signal line, and a second terminal of the second switching device being connected to the lighting-control module and the driving module.

Optionally, the lighting-control module includes a third switching device; and a control terminal of the third switching device is connected to the lighting-control signal line, a first terminal of the third switching device being connected to a power supply voltage line, and a second terminal of the third switching device being connected to the data writing module and the driving module.

Optionally, the lighting-control module includes a third switching device; and a control terminal of the third switching device is connected to the lighting-control signal line, a first terminal of the third switching device being connected to the reference voltage line and a first terminal of the first capacitor, and a second terminal of the third switching device being connected to the data-writing module and the driving module.

Optionally, the switching module includes a fourth switching device; and a first terminal of the fourth switching device is connected to the driving module and the resetting module, a second terminal of the fourth switching device being connected to the lighting module, and a control terminal of the fourth switching device being connected to the lighting-control signal.

Optionally, the lighting device includes an organic light-emitting diode (OLED); and a first terminal of the lighting device is connected to the switching module and a second terminal of the lighting device is connected to a low potential signal line.

Optionally, the driving module includes a driving transistor; and a control terminal of the driving transistor is connected to the resetting module, a first terminal of the driving transistor being connected to the data writing module and the lighting-control module, and a second terminal of the driving transistor being connected to the resetting module and the switching module.

Another aspect of the present disclosure provides a display apparatus. The display apparatus includes the disclosed pixel compensating circuit.

Another aspect of the present disclosure provides a method for driving the disclosed pixel compensating circuit. The method includes providing the initial potential and the reset-control potential to the resetting module by the reference voltage line; providing a scanning signal and writing data voltages into a control terminal of the driving module; and writing a power supply voltage to a first terminal of the driving module.

Optionally, the method further includes using the initial potential and the reset-control potential generated by the reference voltage line to reset a potential at the control terminal of the driving module through the resetting module based on a voltage change of the reference voltage signal.

Optionally, the method further includes using the scanning signal line to provide the scanning signal, turning on the data-writing module, and writing data voltages into the control terminal of the driving module through the data-writing module based on the scanning signal.

Optionally, the method further includes turning off the data-writing module, using a lighting-control signal line to provide a lighting-control signal to turn on a lighting-control module, and writing a power supply voltage into a first terminal of the driving module through the lighting-control module based on the lighting-control signal.

Optionally, the method further includes turning on a switching module; electrically connecting the driving module and a lighting module; and the driving module driving the lighting module to emit light.

Optionally, in a resetting phase, a fourth switching device is turned off to electrically disconnect the lighting module from the driving module, the reference voltage line outputting the reference voltage signal, and the reference voltage signal changing from an initial potential to a reset-control potential so that the control terminal of the driving module is reset; in a data writing and threshold voltage compensating phase, the reference voltage remains at the reset-control potential and the scanning signal turns on the data-writing module such that data voltages outputted by a data voltage line is written into the control terminal of the driving module; and in a lighting phase, the scanning signal turns off the data-writing module, the reference voltage changes from the reset-control potential to the initial potential, the lighting-control signal turns on a light-control module and a switching module, and the driving module is operated in a saturation region to drive the lighting module for emitting light.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

The transistors used in the embodiments of the present disclosure may be TFTs, field-effect transistors (FETs), or other devices with similar functions. Embodiments of the present disclosure should not limit the specific type of transistors. It should be noted that, a transistor has at least one gate, a source, and a drain. In the disclosed embodiments, the control terminal represents the gate(s) of the transistor, the first terminal represents the source of the transistor, and the second terminal represents the drain of the transistor. In addition, based on the characteristics of the transistors, the transistors can be divided into N-type transistors and P-type transistors. In the disclosed embodiments, for illustrative purposes, the transistors are P-type transistors. It should be noted that, the working principles of using N-type transistors in the pixel compensating circuits are known to those skilled in the art and should also be within the scope of the present disclosure.

One aspect of the present disclosure provides a pixel compensating circuit.

Figure 1:
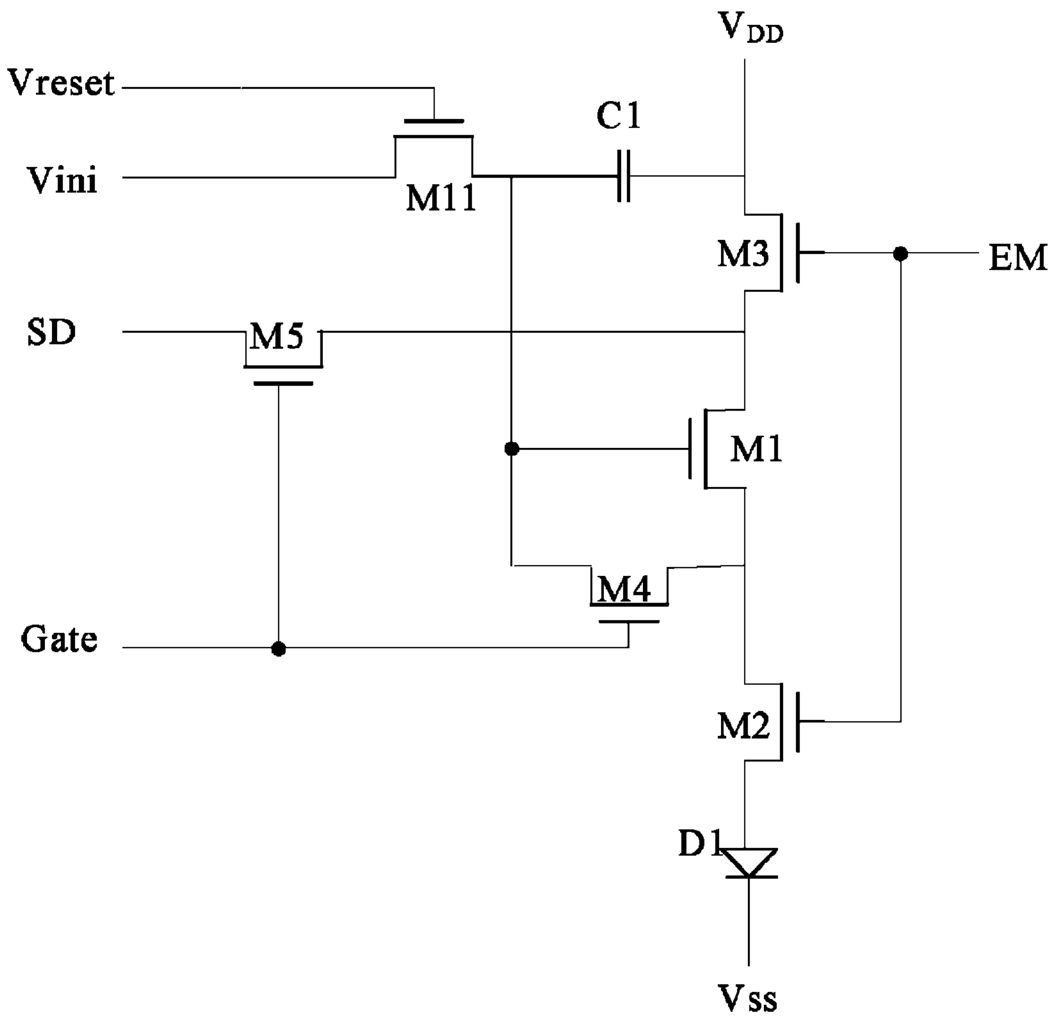
Figure 1 (Prior Art)
FIG. 1 illustrates structure of an existing pixel compensating circuit.
Figure 2:
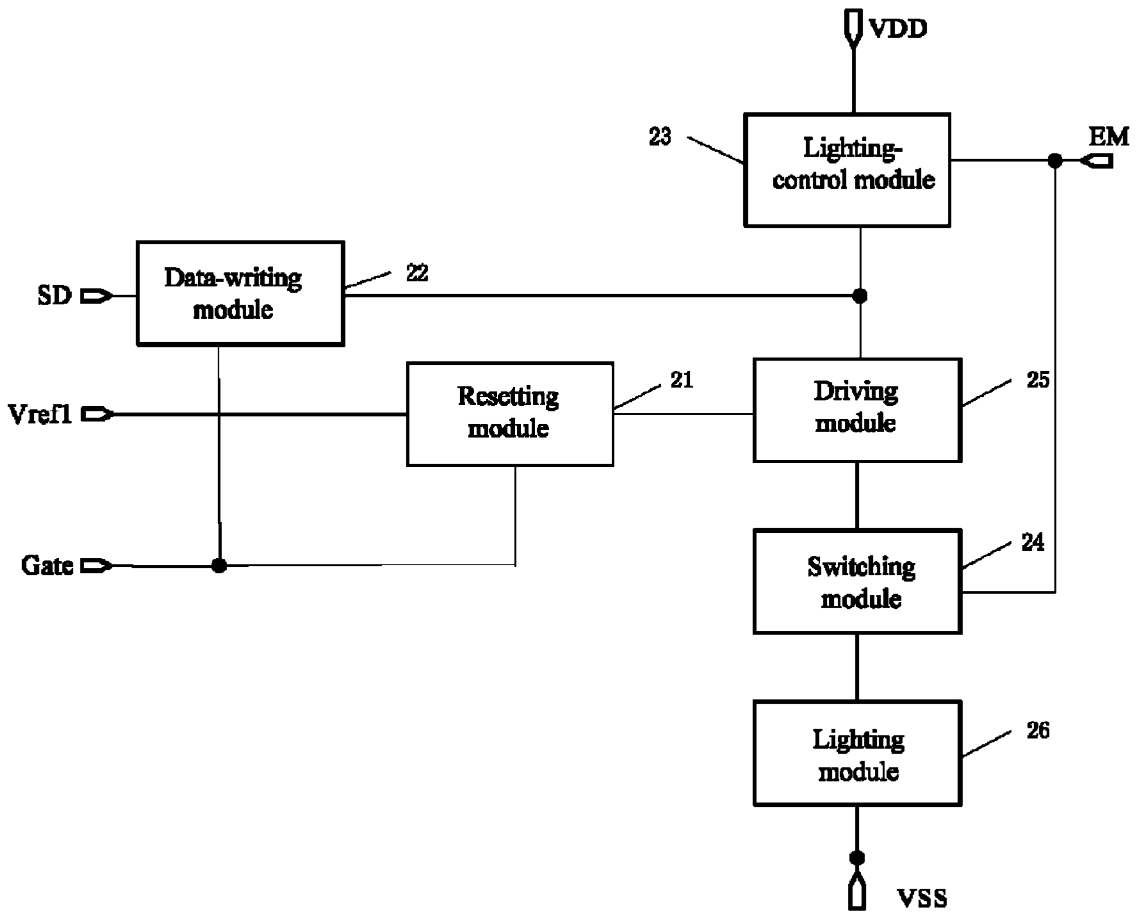
FIG. 2 illustrates the block diagram of an exemplary pixel compensating circuit according to the embodiments of the present disclosure.

FIG. 2 illustrates a block diagram of a pixel compensating circuit provided by the present disclosure. As shown in FIG. 2, a reference voltage line can be used to provide the reset-control signal $V_{reset}$ and the initial voltage signal $V_{ini}$. The pixel compensating circuit may include a resetting module 21, a data-writing module 22, a lighting-control module 23, a switching module 24, a driving module 25, and a lighting module 26.

The resetting module 21 may be connected to the reference voltage line Vref and the driving module 25 to receive the reference voltage signals and may vary the voltage outputted according to the received reference voltage signals. The resetting module 21 may also reset the potential at the control terminal of the driving module 25. The reference voltage line Vref1 may be used to generate initial potential V1 and reset-control potential V2.

The data-writing module 22 may be connected to a data signal line SD, a scanning signal line Gate, and the driving module 25. The data-writing module 22 may write data signals received from the data signal line SD into the control terminal of the driving module 25 according to the scanning signals received from the scanning signal line Gate.

The lighting-control module 23 may be connected to the lighting-control signal line EM and the driving module 25. The lighting-control module 23 may write the power supply voltage $V_{DD}$ into the first terminal of the driving module 25 according to the lighting-control signals received from the lighting-control signal line EM.

The switching module 24 may be connected to the lighting-control signal line EM, the lighting module 26, and the driving module 25. The lighting-control signal line EM may send lighting-control signals to the switching module 24, and the switching module 24 may control the electric connection between driving module 25 and the lighting module 26 according to the received lighting-control signals.

In the pixel compensating circuit provided by the present disclosure, the resetting module 21 may be connected to the reference voltage line Vref1, and the reference voltage line Vref1 may reset the driving module 25 with a simplified resetting module 21 (i.e., omitting the transistor M11 in the prior art).initial potential V1 By changing the voltages (i.e., between high potentials and low potentials) provided by the reference voltage line Vref1, the driving module 25 may be reset by the resetting module 21. Thus, the disclosed pixel compensating circuit can still realize the functions of the existing pixel compensating circuit with 5 transistors and 5 signal lines. The structure of the pixel compensating circuit can be simpler and more suitable for the layout of display products with high resolutions. Production cost can be reduced.

Figure 3:
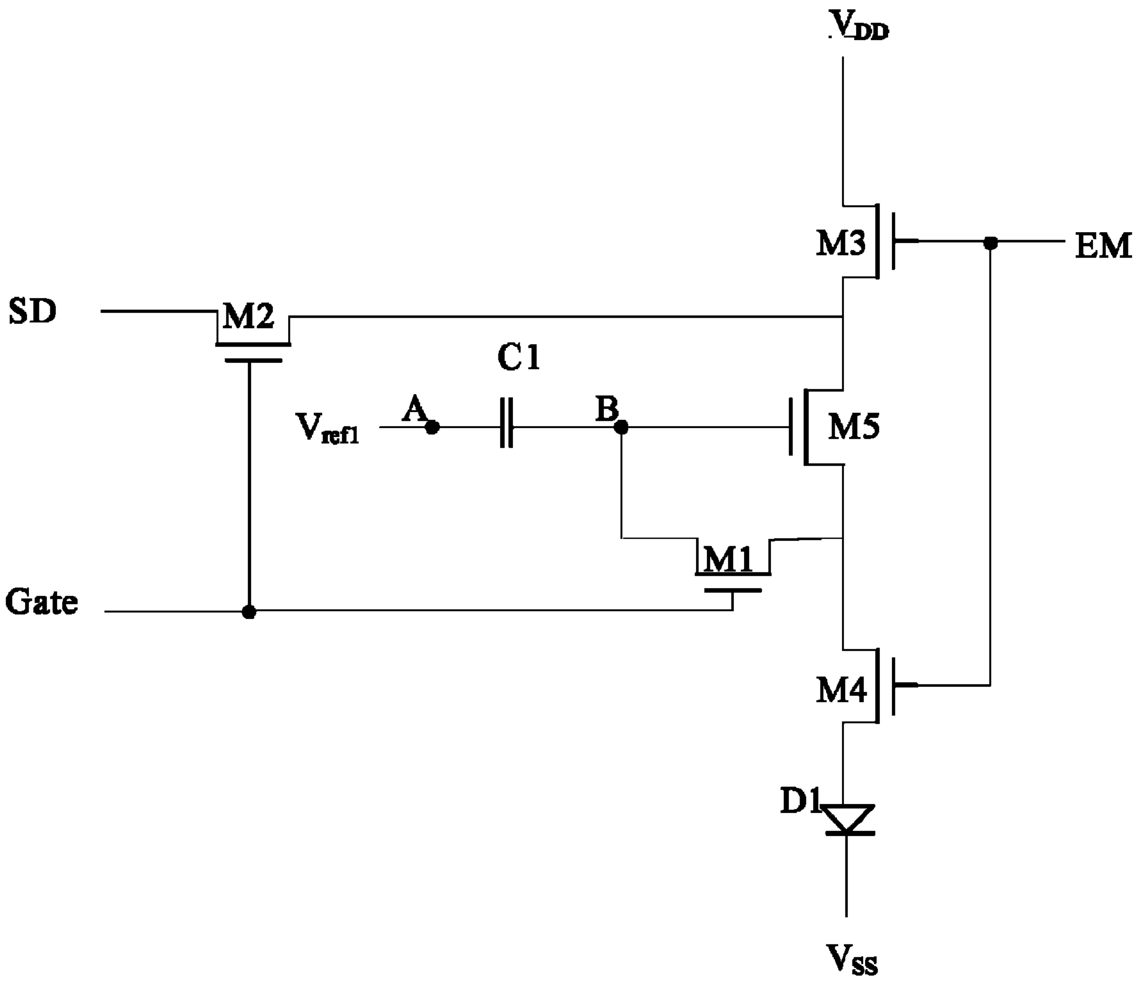
FIG. 3 illustrates the structure of the pixel compensating circuit illustrated in FIG. 2.

In some embodiments, as shown in FIG. 3, in the pixel compensating circuit provided by the present disclosure, the resetting module 21 may include a first switching device M1 and a first capacitor C1.

A first terminal of the first switching device M1 may be connected to a second terminal of the driving module 25, and a second terminal of the first switching device M1 may be connected to the control terminal of the driving module 25. The control terminal of the first switching device M1 may be connected to the scanning signal line Gate. A first terminal of the first capacitor C1 (node A) may be connected to the reference voltage line Vref1, and a second terminal of the first capacitor C1 (node B) may be connected to the control terminal of the driving module 25 and the second terminal of the first switching device M1.

Figure 4:
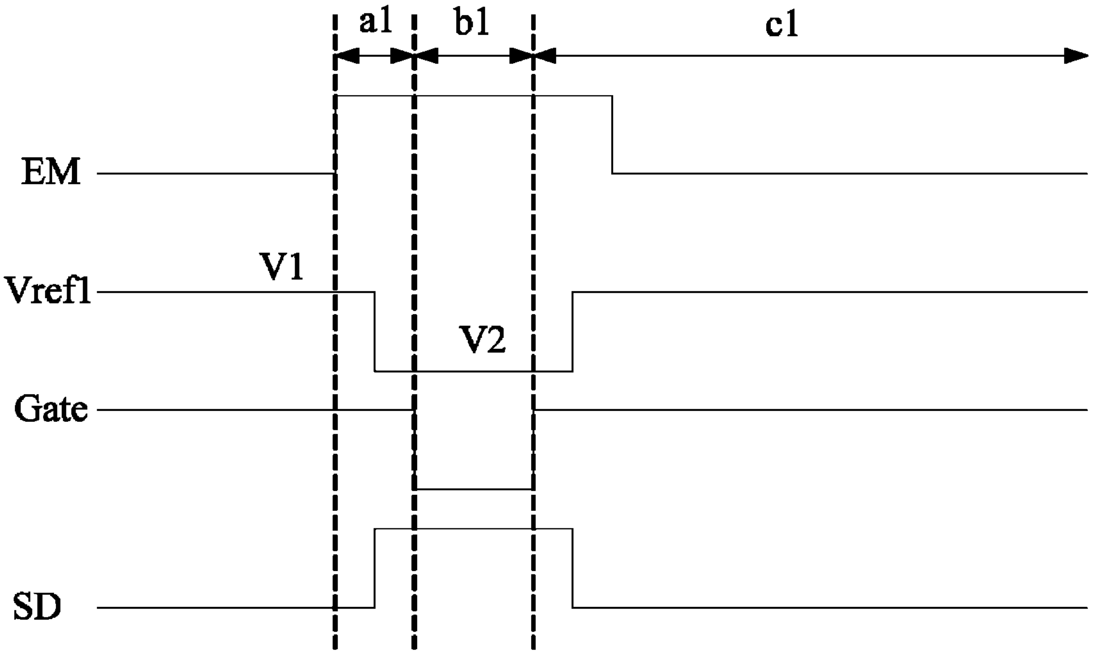
FIG. 4 illustrates the waveforms of certain signals of the pixel compensating circuit illustrated in FIG. 2.

FIG. 4 illustrates the timing waveforms of certain signals provided by corresponding signal lines of the disclosed pixel compensating circuit. The operation of the pixel compensating circuit may include a resetting phase (a1), a data writing and threshold voltage compensating phase (b1), and a lighting phase (c1).

In the resetting phase (a1), the resetting module 21 may be in operation. The lighting-control signal line EM and the scanning signal line Gate may be off. The reference voltage signal $V_{ref1}$ may provide an initial potential V1. That is, the potential at node A (FIG. 2), i.e., connected to the reference voltage line Vref1, may be equal to V1. Further, the reference voltage signal $V_{ref1}$ may change from V1 to a reset-control potential V2, lower than the initial potential V1, such that the change of voltage is equal to (V1-V2) at node A. Meanwhile, the potential at node B may undergo an instantaneous change according to the voltage change at node A, and the change of voltage at node B (as shown in FIG. 2) may also be equal to (V1-V2). That is, the potential at node B can be reset to a low potential before data voltage signals are written into the control terminal of the driving module 25. When the range of (V1-V2) is sufficiently large, it can be ensured that under different grayscale voltages, the potential at node B (i.e., the control terminal of the driving module 25) is reset to a suitable potential without affecting the voltages of data signals for the next frame.

In some embodiments, as shown in FIG. 3, the data-writing module 22 may include a second switching device M2. A first terminal of the second switching device M2 may be connected to the data signal line SD, and the control terminal of the second switching device M2 may be connected to the scanning signal line Gate. The second terminal of the second switching device M2 may be connected to the lighting-control module 23 and the driving module 25. The second switching device M2 may be a transistor.

In the data writing and threshold voltage compensating phase (b1), the data-writing module 22 may be in operation. The lighting-control signal line EM may be off and the scanning signal line Gate may be on. The reference voltage signal $V_{ref1}$ may remain at potential V2. The scanning signal line Gate may provide a low potential to turn on the first switching device M1 and the second switching device M2. Because the second switching device M2 is turned on, the data signals from the data signal line SD may be transmitted/sent to the first terminal of the driving module 25. Because the first switching device M1 is turned on, the control terminal and the second terminal of the driving module 25 can be electrically connected. The driving module 25 may function as a diode. Because the scanning signals may remain at a low potential, the driving module 25 may be operated in the saturation region, and the potential of the control terminal of the driving module 25 may be equal to ($S_D$+$V_{th}$), where $S_D$ represents the data signal provided by the data signal line SD and $V_{th}$ represents the threshold voltage of the driving module 25. Thus, the potentials at the two terminals of the capacitor C1 may be equal to V2 at node A, and may be equal to ($S_D$+$V_{th}$) at node B, respectively. That is, the compensated data signal being equal to ($S_D$+$V_{th}$) may be written into the control terminal of the driving module 25.

In some embodiments, as shown in FIG. 3, the lighting-control module 23 may include a third switching device M3. The control terminal of the third switching device M3 may be connected to the lighting-control signal line EM, and a first terminal of the third switching device M3 may be connected to the power supply VDD. A second terminal of the third switching device M3 may be connected to the data-writing module 22 and the driving module 25.

In the lighting phase (c1), the lighting-control module 23 may be in operation. The scanning signal line Gate may be off, and the transistors M4 and M5 may be turned off. The power supply VDD may provide a DC voltage $V_{DD}$, i.e., the biasing voltage, to the pixel compensating circuit. Before the lighting-control signal EM is on, the reference voltage signal $V_{ref1}$ may change from the lower potential V2 to the higher potential V1. That is, the potential at the first terminal node A of the first capacitor C1 may change instantaneously from the lower potential V2 to the higher potential V1. According to the principle of charge conservation, the potential at the second terminal node B of the first capacitor C1 may change instantaneously from ($S_D$+$V_{th}$) to high potential (V2−V1+$S_D$+$V_{th}$). That is, in lighting phase, the potential at the control terminal of the driving module 25 may be changed to (V2−V1+$S_D$+$V_{th}$). Further, the lighting-control signal $E_M$, provided by the lighting-control line EM, may be on, and the third switching device M3 and the switching module 24 may be turned on. Because the third switching device M3 is turned on, the power supply voltage $V_{DD}$ may be transmitted to the first terminal of the driving module 25. Thus, the driving module 25 may be operated in the saturation region. The current equation for transistors in saturation region can be described as equation (1).

$$I_{ds}=1/2\times K\times(V_{gs}-V_{th})^2=1/2\times K\times(V2-V1+S_D+V_{th}-V_{DD}-V_{th})^2=1/2\times K\times(V2-V1+S_D-V_{DD})^2 \quad (1)$$

$V_{gs}$ may represent the voltage difference between the control terminal and the first terminal of the driving module 25, and $V_{gs}$=$V_g$−$V_s$=(V2−V1+SD+$V_{th}$)−$V_{DD}$. K may represent a parameter associated with the structure of the transistor and can be considered a constant in transistors with same structures.

Thus, the current (i.e., the driving current) flowing through the OLED D1, connected to the second terminal of the driving module 25, may only be dependent on the reference voltage signal $V_{ref1}$, the data signal $S_D$, and the power supply voltage $V_{DD}$ and independent of the threshold voltage of any transistors. Variation of the driving current cause by differences in threshold voltages of transistors in the circuit can be compensated.

In some embodiments, as shown in FIG. 3, the switching module 24 may include a fourth switching device M4. A first terminal of the fourth switching device M4 may be connected to the driving module 25 and the resetting module 21, and a second terminal of the fourth switching device M4 may be connected to the lighting module 26. The control terminal of the fourth switching device M4 may be connected to the lighting-control signal line EM.

When the lighting-control signal line EM is on, i.e., EM outputs a low potential $E_M$, the fourth switching device M4 may be turned on. The driving module 25 and the lighting module 26 may be electrically connected, and the driving module 25 may drive the lighting module 26 to emit light.

It should be noted that, in one embodiment, as shown in FIG. 4, the data signal line SD may output the data signal $S_D$ before the data writing and threshold voltage compensating phase (b1) and stop outputting the data signal $S_D$ after the data writing and threshold voltage compensating phase (b1) to prevent data signal delay. That is, the data line SD may output the data signal $S_D$ in the resetting phase (a1) and stop outputting the data signal $S_D$ in the lighting phase (c1) to prevent or reduce data signal delay.

In some embodiments, as shown in FIG. 3, the lighting module 26 may include the OLED D1. A first terminal of the OLED D1 may be connected to the switching module 24, and a second terminal of the OLED D1 may be connected to the low potential signal line VSS.

In the disclosed embodiments, the OLED D1 may be an OLED or any suitable current-driven light-emitting device incorporating an OLED. The present disclosure should not limit the specific type of D1. For illustrative purposes, the D1 in the disclosed embodiments is an OLED.

In some embodiments, as shown in FIG. 3, the driving module 25 may include a driving transistor M5. The control terminal of the driving transistor M5 may be connected to the resetting module 21, a first terminal of the driving transistor M5 may be connected to the data-writing module 22 and the lighting-control module 23, and a second terminal of the driving transistor M5 may be connected to the resetting module 21 and the switching module 24.

The disclosed pixel compensating circuit may include 5 transistors, 1 capacitor, four pulse signal lines (EM, Gate, Vref1, and SD), and $V_{DD}$ as the DC power supply voltage/signal. That is, the layout reflecting the disclosed pixel compensating circuit may include 5 TFTs, 1 Capacitor, and 5 Lines. Compared to the existing pixel compensating circuit, the disclosed pixel compensating circuit may reduce the number of transistors by 1 and reduce the number of signal lines by 1. Thus, by using the disclosed pixel compensating circuit, the functions of the existing pixel compensating circuit can be realized with less transistors and signal lines. The structure of the pixel compensating circuit can be simplified and thus be more suitable for the layout of display products with high resolutions. The production cost for the display products can be reduced.

Another aspect of the present disclosure provides a method for driving the pixel compensating circuit. The method can be used to drive the pixel compensating circuit described above (as shown in FIGS. 2 and 3).

Figure 5:
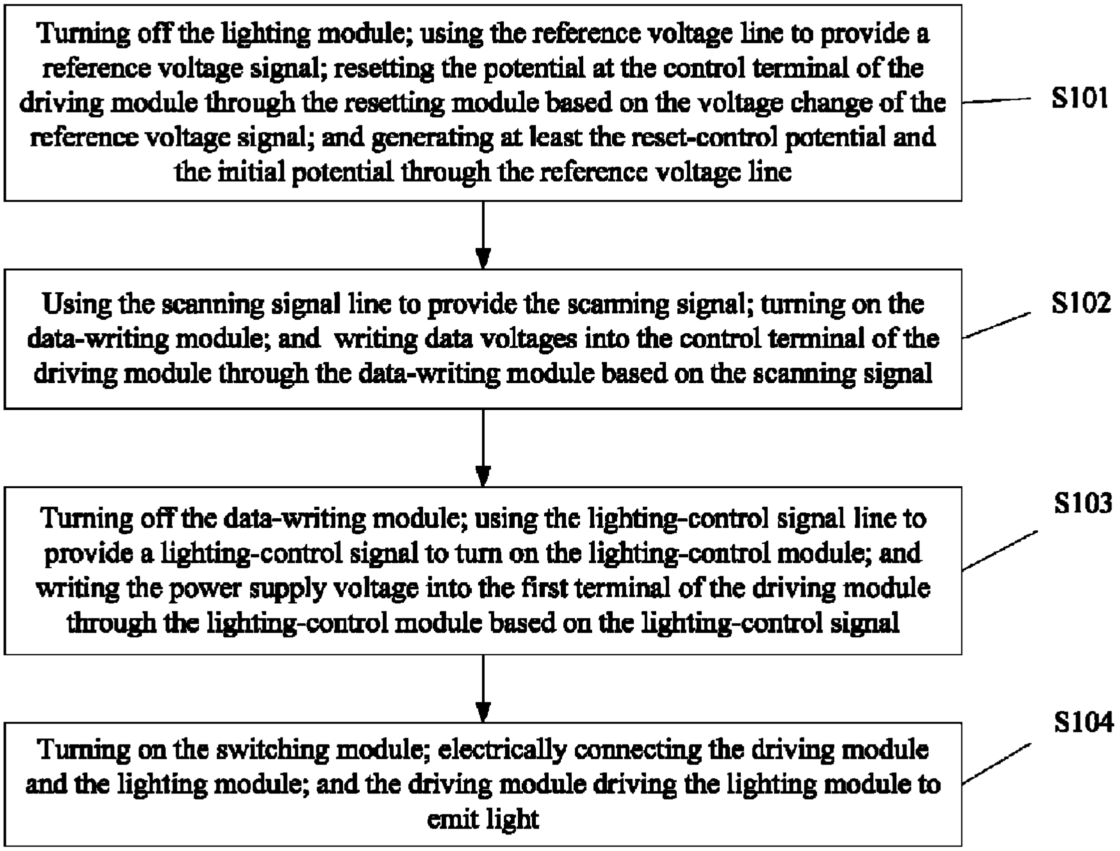
FIG. 5 illustrates an exemplary process of the method for driving the pixel compensating circuit illustrated in FIG. 2.

The method may include steps S101 to S104, as shown in FIG. 5.

In step S101, the lighting module 26 may be turned off, the reference voltage line may be used to provide a reference voltage signal, and the resetting module 21 may reset the potential at the control terminal of the driving module 25 based on the voltage change of the reference voltage signal. Further, the reference voltage line may be used to generate at least the reset-control signal and the initial voltage signal.

In some embodiments, in the resetting phase (a1), the switching module 24 may be turned off to disconnect the OLED from the driving module 25. The reference voltage line may be used to provide the reference voltage signal, and the reference voltage signal may change from the initial potential V1 to the reset-control potential V2 instantaneously such that the control terminal of the driving module 25 can be reset.

In step S102, the scanning signal line may provide the scanning signal; the data-writing module 22 may be on; and the data-writing module 22 may write data voltages into the control terminal of the driving module 25 based on the scanning signal.

In some embodiments, in the data writing and threshold voltage compensating phase (b1), the reference voltage signal may remain at the reset-control potential V2. The scanning signal may be on to provide electrical connection between the first switching device and the second switching device, and the data voltage line may provide data voltages and write the data voltages into the control terminal of the driving module 25.

In step S103, the data-writing module may be off, the lighting-control signal line may provide a lighting-control signal to turn on the lighting-control module 23, and the lighting-control module 23 may write the power supply voltage into the first terminal of the driving module 25 based on the lighting-control signal.

In step S104, the switching module may be on, the driving module 25 and the lighting module 26 may be electrically connected, and the driving module 25 may drive the lighting module 26 to emit light.

In some embodiments, in the lighting phase (c1), the scanning signal may be off, and the reference voltage signal may change instantaneously from the reset-control potential V2 to the initial potential V1. The lighting-control signal may be on so that the third switching device and the fourth switching device may be turned on. The driving module 25 may be operated in saturation region to drive the OLED in lighting module 26 to emit light.

In the disclosed method for driving the pixel compensating circuit, the resetting module 21 may be connected to the reference voltage line Vref1, and the reference voltage line Vref1 may combine the functions of the reset-control signal line Vreset and the initial voltage signal line Vini to generate the reset-control potential V2 and the initial potential V1. By changing the reference voltage, the potential at the control terminal of the driving module 25 can be reset. Thus, by using the disclosed method for driving the pixel compensating circuit, the functions of the existing pixel compensating circuit can be realized with less transistors and less signal lines. The structure of the pixel compensating circuit can be simplified and thus be more suitable for the layout of display products with high resolutions. The production cost for the display products can be reduced.

Figure 6:
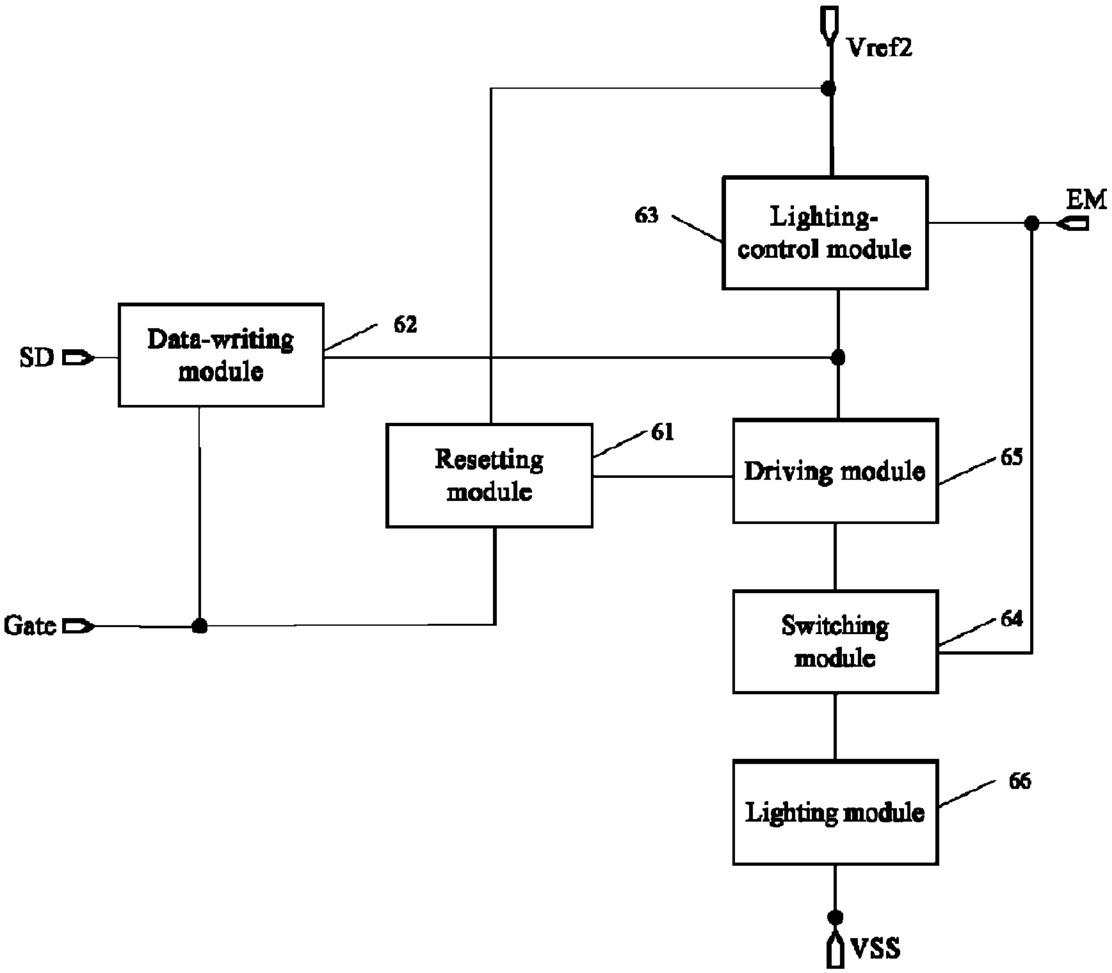
FIG. 6 illustrates the block diagram of another exemplary pixel compensating circuit according to the embodiments of the present disclosure.

FIG. 6 illustrates the structure of another pixel compensating circuit provided by the present disclosure. As shown in FIG. 6, the reference voltage line may be used to generate the reset-control potential V2, the initial potential V1, and the power supply voltage $V_{DD}$. The pixel compensating circuit may include a resetting module 61, a data-writing module 62, a lighting-control module 63, a switching module 64, a driving module 65, and a lighting module 66.

The resetting module 61 may be connected to the reference voltage line Vref2 and the driving module 65 to receive reference voltage signals. Based on the reference voltage signals (i.e., voltage signals), the resetting module 61 may reset the potential at the control terminal of the driving module 65. The reference voltage line Vref2 may be used to generate the reset-control potential V2, the initial potential V1, and the power supply voltage $V_{DD}$.

The data-writing module 62 may be connected to the data signal line SD, the scanning signal line Gate, and the driving module 65. The data-writing module 62 may write data voltages into the control terminal of the driving module 65 based on the received scanning signals.

The lighting-control module 63 may be connected to the lighting-control signal line EM and the driving module 65. The lighting-control module 63 may write the power supply voltage $V_{DD}$ into the first terminal of the driving module 65 based on the received lighting-control signals.

The switching module 64 may be connected to the lighting-control signal line EM, the lighting module 66 and the driving module 65. The switching module 64 may control the electrical connection between the driving module 65 and lighting module 66 based on the received lighting-control signals.

In the disclosed pixel compensating circuit, the resetting module 61 may be connected to the reference voltage line Vref2, and the reference voltage line Vref2 may combine the functions of the reset-control signal line Vreset, the initial voltage signal line Vini, and the power supply voltage line VDD to generate the reset-control potential V2, the initial potential V1, and the power supply voltage $V_{DD}$. By controlling the voltage change of the reference voltage line Vref2, the driving module 65 can be reset. Compared to the existing pixel compensating circuit, the disclosed pixel compensating circuit may reduce the number of transistors by 1 and the reduce number of signal lines by 2. The functions of the existing pixel compensating circuit can be realized by using the disclosed pixel compensating circuit. The structure of the pixel compensating circuit can be simplified and thus be more suitable for the layout of the display products with high resolutions. Production cost of the display products can be reduced.

Figure 7:
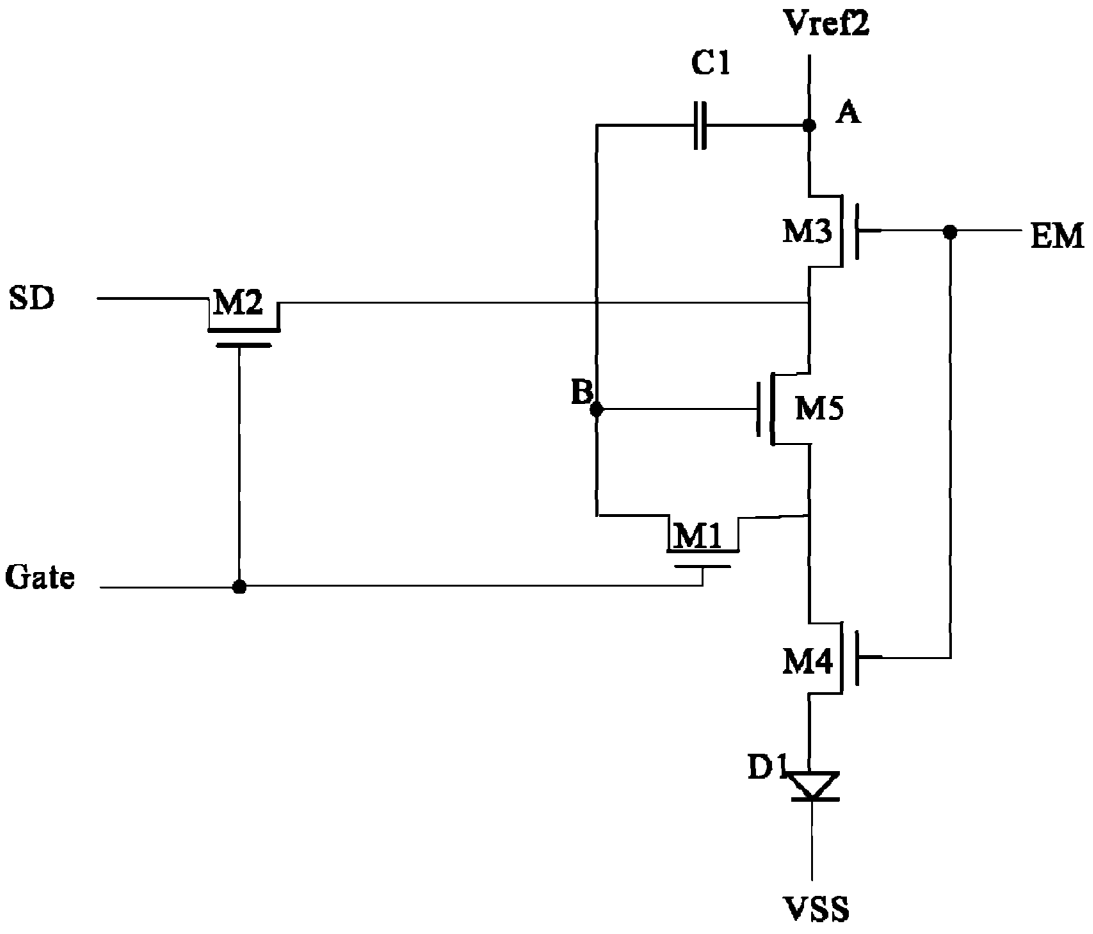
FIG. 7 illustrates the structure of the pixel compensating circuit illustrated in FIG. 6.

In some embodiments, as shown in FIG. 7, in a pixel compensating circuit provided by the present disclosure, the resetting module 61 may include a first switching device M1 and a first capacitor C1. A first terminal of the first switching device M1 may be connected to a second terminal of the driving module 65. A second terminal of the first switching device M1 may be connected to the control terminal of the driving module 65. The control terminal of the first switching device M1 may be connected to the scanning signal line Gate.

A first terminal node A of the first capacitor C1 may be connected to the reference voltage line Vref2 and the lighting-control module 63. A second terminal of the first capacitor C1 may be connected to the control terminal of the driving module 65 and the second terminal of the first switching device M1.

Figure 8:
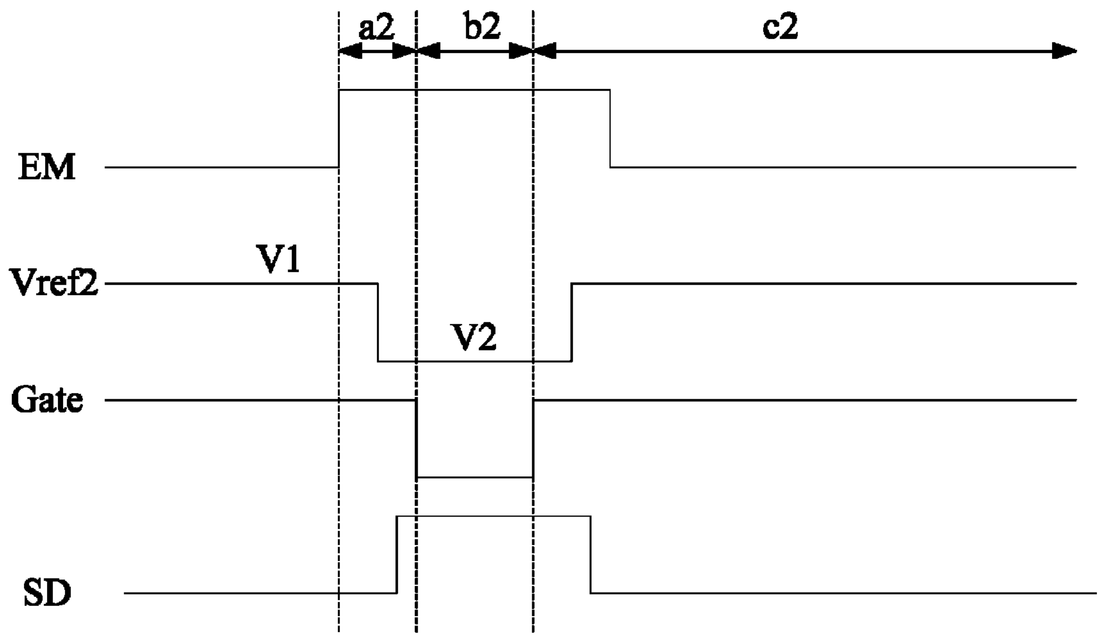
FIG. 8 illustrates the waveforms of certain signals of the pixel compensating circuit illustrated in FIG. 6.

FIG. 8 illustrates timing waveforms of certain signal provided by corresponding signal lines of the disclosed pixel compensating circuit. The operation of the pixel compensating circuit may include a resetting phase (a2), a data writing and threshold voltage compensating phase (b2), and a lighting phase (c2).

In the resetting phase, the resetting module 61 may be in operation. The lighting-control signal line EM and the scanning signal line Gate may both be off. The reference voltage line connected to the first terminal node A of the first capacitor C1 may provide the reference voltage signal $V_{ref2}$, and the initial value of the reference voltage signal $V_{ref2}$ may be a higher potential V1. That is, the potential at node A may be the high potential V1. Further, the reference voltage signal $V_{ref2}$ may change instantaneously from the high potential V1 to a lower potential V2, and the voltage change of the reference voltage signal, i.e., at node A, may be equal to (V1-V2). The potential at node B may also undergo an instantaneous change according to the potential change at node A. The potential change at node B may also be equal to (V1-V2). That is, the potential at node B may be reset to a low potential before data voltage are written into the driving module 65. When the range of (V1-V2) is sufficiently large, it can be ensured that under different grayscale voltages, the potential at node B (i.e., the control terminal of the driving module 65) is reset to a suitable potential without affecting the voltages of data signals for the next frame.

In some embodiments, as shown in FIG. 7, the data-writing module 62 may include a second switching device M2. A first terminal of the second switching device M2 may be connected to the data signal line SD, and the control terminal of the second switching device M2 may be connected to the scanning signal Gate. The second terminal of the second switching device M2 may be connected the lighting-control module 63 and the driving module 65.

In the data writing and threshold voltage compensating phase b2, the data-writing module 62 may be in operation. The lighting-control signal line EM may be off and the reference voltage signal may remain at potential V2. The scanning signal Gate may be on to turn on the first switching device M1 and the second switching device M2. When the second switching device M2 is turned on, the second switching device M2 may transmit the data signal $S_D$ (data voltages provided by the data signal line SD) to the control terminal of the driving module 65. When the first switching device M1 is turned on, the control terminal and the second terminal of the driving module 65 can be electrically connected. The driving module 65 may function as a diode. Because the scanning signal may remain at a low potential, the driving module 65 may function in the saturation region, and the potential at the control terminal of the driving module 65 may be equal to ($S_D$+$V_{th}$), and $V_{th}$ is the threshold voltage of the second switching device M2. Thus, the first terminal node A of the first capacitor C1 may be V2, and the second terminal node B of the first capacitor C1 may be equal to ($S_D$+$V_{th}$). That is, data voltage of ($S_D$+$V_{th}$) may be written into the control terminal of the driving module 65.

In some embodiments, as shown in FIG. 7, the lighting-control module 63 may include a third switching device M3. The control terminal of the third switching device M3 may be connected to the lighting-control signal line EM. A first terminal of the third switching device M3 may be connected to the reference voltage line Vref2 and the first terminal of the first capacitor C1. A second terminal of the first capacitor may be connected to the data-writing module 62 and the driving module 65.

In the lighting phase (c2), lighting-control module 63 may be in operation. The scanning signal line Gate may be off, and the first switching device M1 and the second switching device M2 may be turned off. Before the lighting-control signal EM is on, the reference voltage $_{Vref2}$ may change instantaneously from the low potential V2 to the high potential V1. That is, the potential at the first terminal node A of the first capacitor C1 may change instantaneously from the low potential V2 to the high potential V1. According to the principles of charge conservation, the second terminal node B of the first capacitor C1 may also change instantaneously from ($S_D$+$V_{th}$) to the high potential (V2−V1+$S_D$+$V_{th}$). That is, in the lighting phase (c2), the control terminal of the driving module 65 may change to (V2−V1+$S_D$+$V_{th}$). Further, the lighting-control signal $E_M$, provided by the lighting-control signal line EM, may be turned on, and the third switching device M3 and the switching module 64 may be turned on. Because the third switching device M3 is turned on, the power supply voltage V1 can be transmitted to the first terminal of the driving module 65. The driving module 65 may be operated in the saturation region. The current equation for transistors in saturation region can be described as equation (2).

$$I_{ds}=1/2\times K\times(V_{gs}-V_{th})^2=1/2\times K\times(V2-V1+S_D+V_{th}-V2-V_{th})^2=1/2\times K\times(S_D-V1)^2 \quad (2)$$

$V_{gs}$ may represent the voltage difference between the control terminal and the first terminal of the driving module 65 and $V_{gs}=V_g-V_S=(V2-V1+S_D+V_{th})-V2$. K may represent a parameter associated with the structure of the transistor and can be considered a constant in transistors with same structures.

Thus, the current (i.e., the driving current) flowing through the OLED D1, connected to the second terminal of the driving module 65, may only be dependent on the reference voltage signal $V_{ref2}$ and the data signal $S_D$ and independent of the threshold voltage of the any transistor. Variation of the driving current cause by differences in threshold voltages of the transistors can be compensated.

It should be noted that, in one embodiment, as shown in FIG. 6, the data signal line SD may output the data signal $S_D$ before the data writing and threshold voltage compensating phase (b2) and stop outputting the data signal $S_D$ after the data writing and threshold voltage compensating phase (b2) to prevent data signal delay. That is, the data line SD may output the data signal $S_D$ in the resetting phase (a2) and stop outputting the data signal $S_D$ in the lighting phase (c2) to prevent or reduce data signal delay.

In some embodiments, as shown in FIG. 7, the switching module 64 may include a fourth switching device M4. A first terminal of the fourth switching device M4 may be connected to the driving module 65 and the resetting module 61. A second terminal of the fourth switching device M4 may be connected to the lighting module 66. The control terminal of the fourth switching device M4 may be connected to the lighting-control signal EM.

When the lighting-control signal EM is on, the fourth switching device M4 may be turned on so that the driving module 65 and the lighting module 66 may be electrically connected. The driving module 65 may drive the lighting module 66 to emit light.

In some embodiments, as shown in FIG. 7, the lighting module 66 may include an OLED D1. A first terminal of the OLED D1 may be connected to the lighting module 64, and a second terminal of the OLED D1 may be connected to the low potential signal line VSS.

In the disclosed embodiments, the OLED D1 may be an OLED or any suitable current-driven lighting device incorporating an OLED. The present disclosure should not limit the specific type of D1. For illustrative purposes, the D1 in the disclosed embodiments is an OLED.

In some embodiments, as shown in FIG. 7, the driving module 65 may include a driving transistor M5. The control terminal of the driving transistor M5 may be connected to the resetting module 61. A first terminal of the driving transistor M5 may be connected to the data-writing module 62 and the lighting-control module 63, and a second terminal of the driving transistor M5 may be connected to the resetting module 61 and the switching module 64.

The disclosed pixel compensating circuit may include 5 transistors, 1 capacitor, four pulse signal lines (EM, Gate, Vref2, and SD). That is, the layout reflecting the disclosed pixel compensating circuit may include 5 TFTs, 1 Capacitors, and 4 Lines. Compared to the existing pixel compensating circuit, the disclosed pixel compensating circuit may reduce the number of transistors by 1 and reduce the number of signal lines by 2. Thus, by using the disclosed pixel compensating circuit, the functions of the existing pixel compensating circuit can be realized with less transistors and signal lines. The structure of the pixel compensating circuit can be simplified and more suitable for the layout of display products with high resolutions. The production cost for the display products can be reduced.

Another aspect of the present disclosure provides a method for driving the pixel compensating circuit. The method can be used to drive the pixel compensating circuit described above (as shown in FIGS. 6 and 7).

Figure 9:
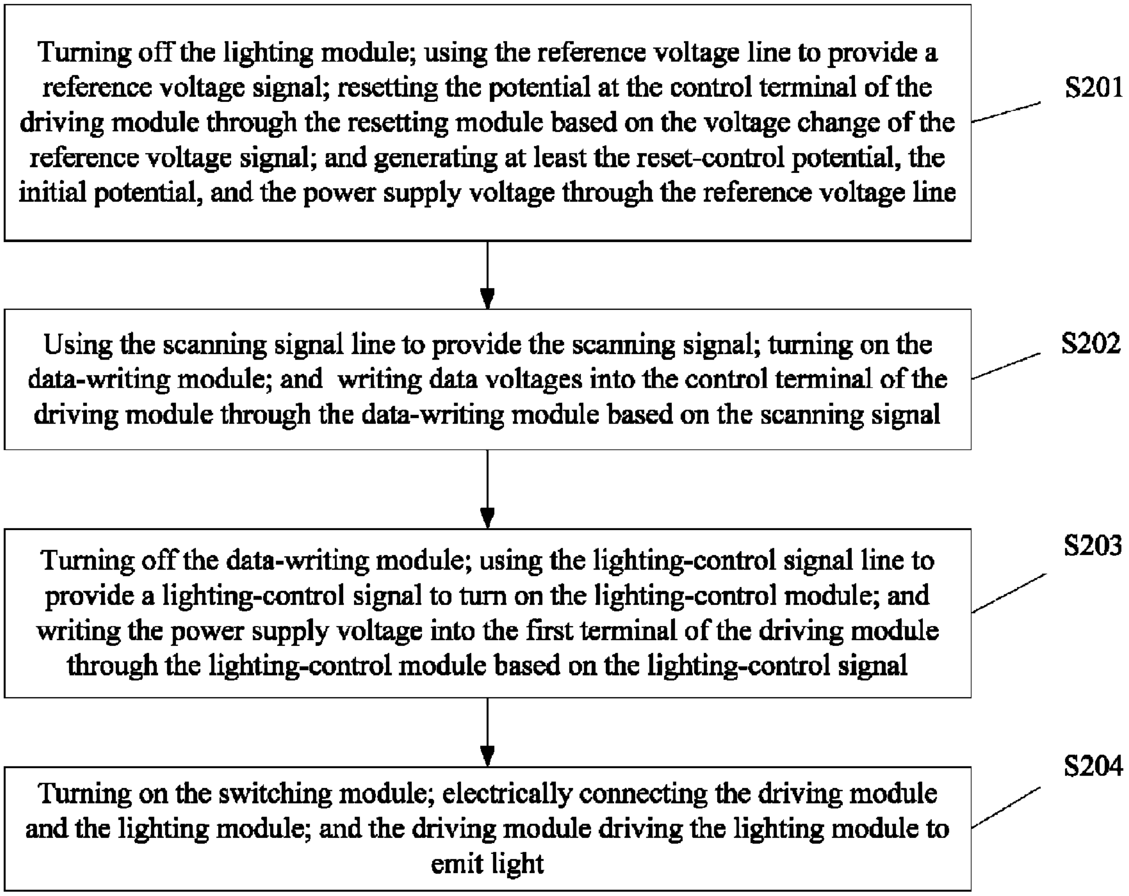
FIG. 9 illustrates an exemplary process of the method for driving the pixel compensating circuit illustrated in FIG. 6.

The method may include steps S201 to S204, as shown in FIG. 9.

In step S201, the lighting module 66 may be turned off, the reference voltage line may be used to provide a reference voltage signal, and the resetting module 61 may reset the potential at the control terminal of the driving module 65 based on the voltage change of the reference voltage signal. Further, the reference voltage line may be used to the reset-control signal, the initial voltage signal, and the power supply voltage.

In some embodiments, in the resetting phase (a2), the fourth switching device may be turned off to disconnect the OLED from the driving module 65. The reference voltage line may be used to provide the reference voltage signal, and the reference voltage signal may change from the initial potential V1 to the reset-control potential V2 instantaneously such that the control terminal of the driving module can be reset.

In step S202, the scanning signal line may provide the scanning signal, and the data-writing module 62 may be turned on. The data-writing module 62 may write data voltages into the control terminal of the driving module 65 based on the scanning signal.

In some embodiments, in the data writing and threshold voltage compensating phase (b2), the reference voltage signal may remain at the reset-control potential V2, and the scanning signal may be on to provide electrical connection between the first switching device and the second switching device. The data voltage line may provide the data voltages and write the data voltages into the control terminal of the driving module 65.

In step S303, the data-writing module may be off, and the lighting-control signal line may provide a lighting-control signal to turn on the lighting-control module 63. The lighting-control module 63 may write the power supply voltage into the first terminal of the driving module 65 based on the lighting-control signal.

In step S204, the switching module 64 may be on, and the driving module 65 and the lighting module 66 may be electrically connected. The driving module 65 may drive the lighting module 66 to emit light.

In some embodiments, in the lighting phase (c2), the scanning signal may be off, the reference voltage signal may change instantaneously from the reset-control potential to the initial potential, and the lighting-control signal may be on. The third switching device and the fourth switching device may be turned on, and the driving module 65 may be operated in saturation region to drive the OLED to emit light.

In the disclosed method for driving the pixel compensating circuit, the resetting module 61 may be connected to the reference voltage line Vref2, and the reference voltage line Vref2 may combine the functions of the reset-control signal line Vreset, the initial voltage signal line Vini, and the power supply voltage VDD to generate the reset-control potential V2, the initial potential V1, and the power supply voltage $V_{DD}$. By changing the reference voltage $V_{ref2}$ provided by the reference voltage line Vref2, the potential at the control terminal of the driving module 65 can be reset. Thus, by using the disclosed method for driving the pixel compensating circuit, the functions of the existing pixel compensating circuit can be realized with less transistors and signal lines. The structure of the pixel compensating circuit can be simplified and more suitable for the layout of display products with high resolutions. The production cost for the display products can be reduced.

Another aspect of the present disclosure further provides a display apparatus. The display apparatus incorporates an OLED display panel or any other suitable display panels. The display apparatus includes a pixel compensating circuit disclosed in FIG. 3 or 7. The display apparatus may include a plurality of pixel arrays, and each pixel array may include a pixel compensating circuit disclosed in FIG. 3 or 7. The advantages of incorporating the disclosed pixel compensating circuit are aforementioned and omitted herein.

Specifically, the display apparatus provided by the present disclosure may incorporate any suitable current-driven light-emitting device such as an LED display panel or an OLED display panel.

By using the disclosed display apparatus, the resetting module 61 may be connected to the reference voltage line, and the reference voltage line may at least combine the functions of the reset-control signal line Vreset and the initial voltage signal line Vini. By changing the reference voltages provided by the reference voltage line, the potential at the control terminal of the driving module can be reset. Thus, by using the disclosed method for driving the pixel compensating circuit, the functions of the existing pixel compensating circuit can be realized with less transistors and less signal lines. The structure of the pixel compensating circuit can be simplified and thus be more suitable for the layout of display products with high resolutions. The production cost for the display products can be reduced.

It should be noted that at least a portion of the embodiments provided by the present disclosure can be realized through suitable hardware or through hardware following commands from suitable programs/software. The software or programs may be stored in readable storage medium of a computer. The readable storage medium may be read-only memory (ROM), magnetic disks, and/or compact disk ROM.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A pixel compensating circuit, comprising:

a driving module;

a resetting module connected to a reference voltage line for providing an initial potential and a reset-control potential, a scanning signal line, and the driving module; and a data-writing module connected to a data signal line, the scanning signal line, and the driving module, wherein:

the resetting module is configured to receive a reference voltage signal and reset a potential of a control terminal of the driving module based on a change of the reference voltage signal such that the reference voltage signal combines functions of a reset control signal and an initial voltage signal, the resetting module includes a first switching device and a first capacitor, a first terminal of the first switching device is connected to a second terminal of the driving module, a second terminal of the first switching device being connected to the control terminal of the driving module, and a control terminal of the first switching device being connected to the scanning signal line, and a first terminal of the first capacitor is connected to the reference voltage line and a lighting-control module, a second terminal of the first capacitor being connected to the control terminal of the driving module and the second terminal of the first switching device such that the reference voltage line is configured to generate the reset-control potential, the initial potential, and a power supply voltage.

2. The pixel compensating circuit according to claim 1, further including:

the lighting-control module connected to a lighting-control signal line and the driving module.

3. The pixel compensating circuit according to claim 1, further including:

a lighting module connected to the driving module.

4. The pixel compensating circuit according to claim 1, wherein:

the data-writing module is configured to output a data voltage signal and write the data voltage signal into the control terminal of the driving module based on the scanning signal.

5. The pixel compensating circuit according to claim 2, wherein:

the lighting-control module is configured to write the power supply voltage into a first terminal of the driving module based on a lighting-control signal provided by the lighting-control signal line.

6. The pixel compensating circuit according to claim 3, further including:

a switching module connected to the driving module and the lighting module to control an electrical connection between the driving module and the lighting module.

7. The pixel compensating circuit according to claim 1, wherein:

the data-writing module includes a second switching device; and a first terminal of the second switching device is connected to the data signal line, a control terminal of the second switching device being connected to the scanning signal line, and a second terminal of the second switching device being connected to the lighting-control module and the driving module.

8. The pixel compensating circuit according to claim 5, wherein the lighting-control module includes a third switching device; and a control terminal of the third switching device is connected to the lighting-control signal line, a first terminal of the third switching device being connected to a power supply voltage line, and a second terminal of the third switching device being connected to the data writing module and the driving module.

9. The pixel compensating circuit according to claim 1, wherein:

the lighting-control module includes a third switching device; and a control terminal of the third switching device is connected to a lighting-control signal line, a first terminal of the third switching device being connected to the reference voltage line and a first terminal of the first capacitor, and a second terminal of the third switching device being connected to the data-writing module and the driving module.

10. The pixel compensating circuit according to claim 6, wherein the switching module includes a fourth switching device; and a first terminal of the fourth switching device is connected to the driving module and the resetting module, a second terminal of the fourth switching device being connected to the lighting module, and a control terminal of the fourth switching device being connected to the lighting-control signal line.

11. The pixel compensating circuit according to claim 6, wherein:

the lighting module includes an organic light-emitting diode (OLED); and a first terminal of the lighting device is connected to the switching module and a second terminal of the lighting device is connected to a low potential signal line.

12. The pixel compensating circuit according to claim 1, wherein:

the driving module includes a driving transistor; and a control terminal of the driving transistor is connected to the resetting module, a first terminal of the driving transistor being connected to the data writing module and the lighting-control module, and a second terminal of the driving transistor being connected to the resetting module and a switching module.

13. A display apparatus, including the pixel compensating circuit of claim 1.

14. A method for driving the pixel compensating circuit of claim 1, comprising:

providing the initial potential and the reset-control potential to the resetting module by the reference voltage line;

providing a scanning signal and writing data voltages into the control terminal of the driving module; and writing the power supply voltage to a first terminal of the driving module.

15. The method according to claim 14, further including:

using the initial potential and the reset-control potential generated by the reference voltage line to reset a potential at the control terminal of the driving module through the resetting module based on a voltage change of the reference voltage signal.

16. The method according to claim 14, further including:

using the scanning signal line to provide the scanning signal, turning on the data-writing module, and writing data voltages into the control terminal of the driving module through the data-writing module based on the scanning signal.

17. The method according to claim 14, further including:

turning off the data-writing module, using a lighting-control signal line to provide a lighting-control signal to turn on a lighting-control module, and writing the power supply voltage into the first terminal of the driving module through the lighting-control module based on the lighting-control signal.

18. The method according to claim 14, further including:

turning on a switching module; electrically connecting the driving module and a lighting module; and the driving module driving the lighting module to emit light.

19. The method according to claim 14, wherein:

in a resetting phase, a fourth switching device is turned off to electrically disconnect the lighting module from the driving module, the reference voltage line outputting the reference voltage signal, and the reference voltage signal changing from the initial potential to the reset-control potential so that the control terminal of the driving module is reset;

in a data writing and threshold voltage compensating phase, the reference voltage remains at the reset-control potential and the scanning signal turns on the data-writing module such that data voltages outputted by a data voltage line is written into the control terminal of the driving module; and in a lighting phase, the scanning signal turns off the data-writing module, the reference voltage changes from the reset-control potential to the initial potential, the lighting-control signal turns on the lighting-control module and a switching module, and the driving module is operated in a saturation region to drive the lighting module for emitting light.

* * * * *